June 8, 1965 B. TERNULLO 3,188,011
SPRINKLER INTERRUPTER DEVICE
Filed Feb. 10, 1964
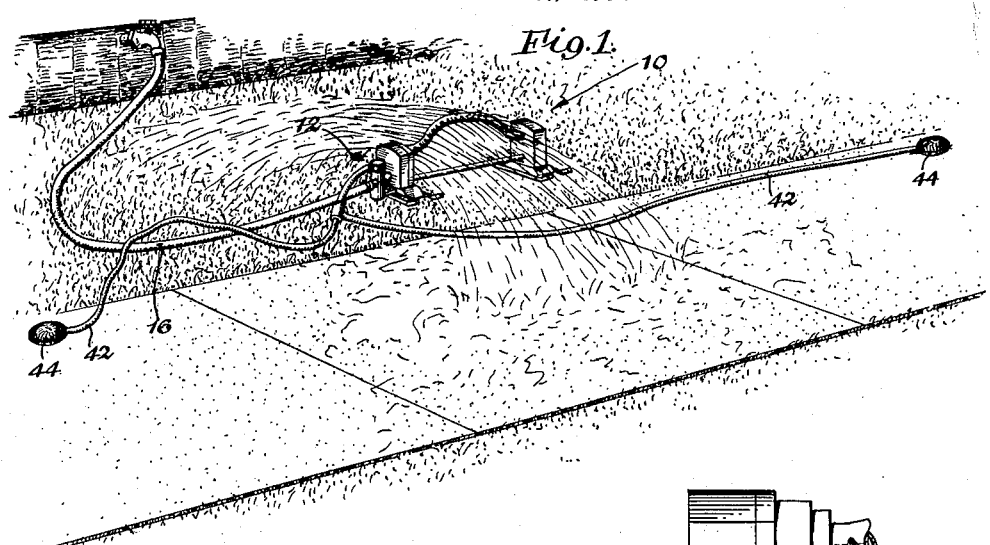
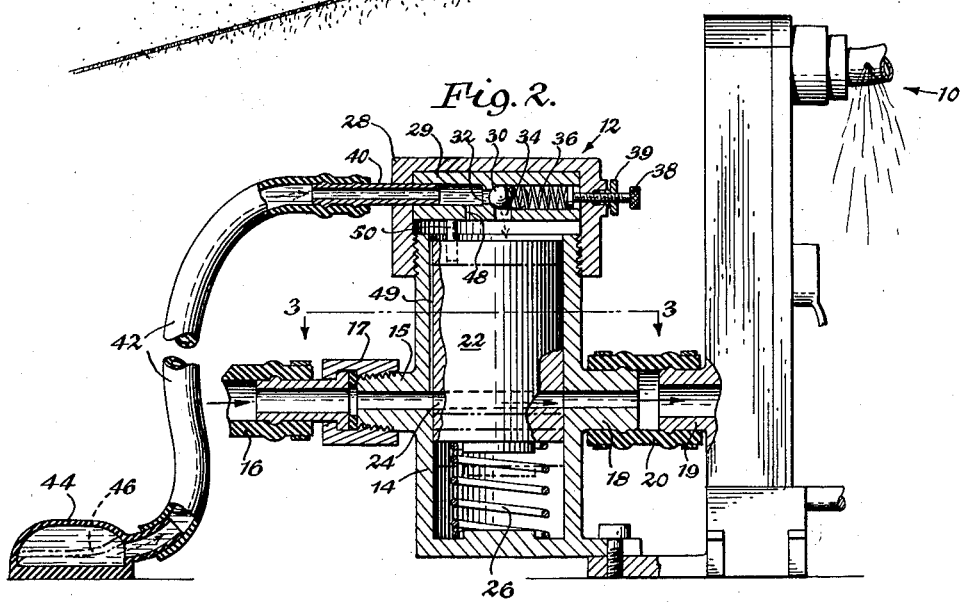
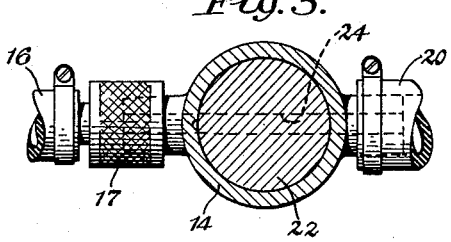
INVENTOR.
BENJAMIN TERNULLO
BY
Bean, Brooks, Buckley & Bean
ATTORNEYS 3,188,011
SPRINKLER INTERRUPTER DEVICE
Benjamin Ternullo, 163 Westchester Blvd.,
Tonawanda 17, N.Y.
Filed Feb. 10, 1964, Ser. No. 343,845
4 Claims. (Cl. 239—578)

This invention relates to water sprinkling systems; and more particularly to operating control means for lawn sprinklers such as may be used for example when watering lawn areas adjacent sidewalks or other pathways such as on golf courses, or the like.

It is a prime object of the present invention to provide a novel, semi-automatically operating, water supply control means in conjunction with a lawn sprinkler; whereby a passer-by may from a remote position and with utmost convenience and facility trigger the control device so that it will cut off the supply of water to the sprinkler and thereby temporarily halt the sprinkler operation so that the pedestrian may pass close by the sprinkler without being showered. Furthermore, an object is to provide the control device to subsequently, and automatically, reactivate the system so as to continue the lawn watering operation after the pedestrian has passed beyond the reach of the sprinkler.

Other more detailed objects of the invention will be apparent from the following specification and the accompanying drawings wherein:

FIG. 1 is a perspective view of a sprinkling system embodying one example of a control arrangement in accordance with the invention;

FIG. 2 is a fragmentary vertical sectional view through the control mechanism; and FIG. 3 is a section taken along line 3—3 of FIG. 2.

As shown by way of example herein, the invention may be employed in conjunction with a lawn sprinkler of the reciprocating spray bar type as indicated generally at 10, but it is to be understood that the invention is equally applicable to any other type of sprinkler deriving its water supply from a pipe or hose as shown in FIG. 1. The control device for the sprinkler is indicated generally at 12, and as shown in FIGS. 2, 3 it comprises a cylindrical chamber 14 having at a side wall portion thereof a water inlet connection 15 for connection to the water supply hose 16, as by means of a standard type coupling 17. At a position diametrically opposite the inlet 15 the chamber 14 is provided with an outlet connection 18 for coupling to the water inlet portion 19 of the sprinkler per se, as by means of a coupling hose 20 for example.

The cylinder 14 houses a piston 22 which is diametrically bored as indicated at 24 in alignment with the water inlet-outlet portions 15, 18 when the piston 22 is at its "normal" or raised position in the cylinder; a compression spring 26 being disposed under the piston to bias it upwardly to its "normal" position as shown in FIG. 2. The cylinder 14 may be bolted at its base as shown, or may be otherwise attached to the sprinkler, or may be more remotely situated from the sprinkler and connected thereto only by means of a hose; as may be preferred.

At its top end the cylinder 14 is closed by means of a screw cap 28 inside of which is carried a valve block 29. The valve block is laterally bored and counterbored from opposite sides to provide a valve seat against which operates a ball valve 30 to control flow of water through a horizontal channel 32 and thence through a vertical channel 34 through the lower portion of the valve block, leading into the interior of the cylinder 14 above the piston 22. A spring 36 biases the ball 30 to the left as seen in FIG. 2 and thus "normally" closes the channels 32, 34. A screw 38 controls the tension on the spring 36, and is locked in various positions of adjustment by means of a lock nut 39.

A conduit connection as indicated at 40 extends through the side wall of the cap 28 into communication with the valve block bores, for coupling with a hose 42. The hose 42 may have any desired number of branches, and as shown herein includes two branches such as may be arranged to lead away from the control valve device 12 to positions on the illustrated sidewalk (FIG. 1) for example, remote from the reach of the sprinkler spray. At their ends, the conduits 42 are fitted with pressure pads 44 which are "normally" disposed in their expanded, water-filled, condition as shown best in FIG. 2. Depression of the pads, as by stepping thereon will compress the top walls thereof as to the position indicated at 46 (FIG. 2) whereby the water previously occupying the pad will be displaced to force its way into the conduit 42, whereby a surge of water under pressure moves into the valve block 29 and forces the valve ball 30 to retreat against the action of its spring 36, whereby a volume of water moves through the hose 42 and through the valve device to force the piston 22 to displace downwardly against its spring 26. This disaligns the port 24 through the piston relative to the inlet-outlet ports of the cylinder 14, thereby cutting off the supply of water to the sprinkler 10.

Upon cessation of pressure on the controlling pad 44 the spring 36 returns the ball 30 to seated position closing the valve port 32. The valve block 29 is formed with a small "bleeder" port 48 which now functions to permit a slow return of water from within the cylinder 14 (above the piston) back into the hose line 42 and the pad 44, thereby refilling them and restoring the pad to its "normal" or expanded condition. A groove as indicated at 49 (FIG. 2) is formed in the side of the piston 22 (or in the wall of the cylinder 14) to permit water to slowly flow whenever needed from the inlet portion 15 into the cylinder above the piston, to "make-up" for any water losses in the mechanism such as might occur because of leakages between relatively moving parts.

It will of course be appreciated that the "bleeder" port 48 and the groove 49 will be of relatively small dimensions so that they will not interfere with the pressure differential requirements interiorly of the mechanism for shutting off water flow to the sprinkler when the pad 44 is trod upon, as explained hereinabove. Also, it will be understood that the size of the port 48 and the pressure on the spring 36 may be adjusted so as to provide any desired timing for the "return" of the piston 22 to its "normal" or sprinkler-operating position. A pin as indicated at 50 may be conveniently provided to extend upwardly from the top of the piston 22, to limit the upward movement of the piston to the position of alignment of the inlet-outlet ports with the piston passageway 24 (FIG. 2).

Therefore, whereas when the valve mechanism is in its "normal" or "open" condition and the sprinkler is in operation, whenever a pedestrian or the like wishes to pass by or closely approach the sprinkler device, he may simply foot-press one of the pads 44 as shown herein. The valve device will thereby be actuated to shut off the supply of water to the sprinkler, and the pedestrian may thereupon pass by or otherwise approach within the range of the sprinkler without being wetted.

Assuming, for example, that the device is set up as shown in FIG. 1 in association with a side walk or the like, it will be apparent that pedestrians approaching the sprinkler from either direction may simply foot-press the nearest control pad 44, whereupon the valve device will temporarily cut off the water supply to the sprinkler; and assuming that the screw 38 had been properly pre-adjusted, the water supply will remain off until sufficient time has elapsed for the pedestrian to move on beyond the other side of the range of the sprinkler.

It will of course be appreciated that although only one form of the invention has been illustrated and described in detail herein, various changes may be made therein without departing from the spirit of the invention or the scope of the following claims.

I claim:

1. A water sprinkler control system comprising in combination, a sprinkler, a water supply conduit under pressure, a valve device receiving water from said supply conduit and normally passing said water directly to the sprinkler, said valve device including a housing and a piston movable therein, said piston having a water passageway transversely therethrough in alignment with the valve inlet and outlet portions when in one position of said piston, a compression spring biasing said piston towards said position, and a valve control mechanism including a control conduit in open communication with a control pressure inlet port leading to the interior of said housing behind said piston and at its other end terminating in a pressure pad adapted to be disposed at a position remote from said sprinkler, a check valve device disposed in said housing inlet port for control thereof, whereby when pressure is applied to said control pad fluid is displaced into said port thereby unseating said check valve and passing into the interior of said housing behind said piston thereby displacing the latter against said spring means and thereby cutting off the flow of water from said supply conduit to said sprinkler, and a bleeder port intercommunicating the interior of said housing and said control conduit to permit refilling of said pressure pad at a metered rate.

2. A water sprinkler control system comprising in combination, a sprinkler, a water supply conduit under pressure, a valve device receiving water from said supply conduit and normally passing said water directly to the sprinkler, said valve device including a housing and a piston movable vertically therein, said piston having a water passageway transversely therethrough in alignment with the valve inlet and outlet portions when in one position of said piston, a compression spring biasing said piston towards said position, and a valve control mechanism including a control conduit in open communicaion with a control pressure inlet port leading to the interior of said housing above said piston and at its other end terminating in a pressure pad adapted to be disposed at a position remote from said sprinkler, said housing inlet port being controlled by a check valve device, whereby when pressure is applied to said control pad fluid is displaced into said port thereby unseating said check valve and applying increased pressure interiorly of said housing above said piston thereby displacing the latter against said spring means and thereby cutting off the flow of water through said valve outlet port, and a bleeder port intercommunicating the interior of said housing and said control conduit to permit refilling of said pressure pad at a metered rate.

3. A water sprinkler control system comprising in combination, a sprinkler, a water supply conduit under pressure, a valve device receiving water from said supply conduit and normally passing said water directly to the sprinkler, said valve device including a housing and a piston movable therein, said piston having a water passageway transversely therethrough in alignment with the valve inlet and outlet portions when in one position of said piston, a compression spring biasing said piston towards said position, and a valve control mechanism including a control conduit at one end in open communication with a control pressure inlet port leading to the interior of said housing behind said piston, said control conduit terminating at its other end in a pressure pad adapted to be disposed at a position remote from said sprinkler, said housing inlet port being controlled by a check valve device, whereby when pressure is applied to said control pad fluid is displaced into said port thereby unseating said check valve and applying increased pressure interiorly of said housing behind said piston thereby displacing the latter against said spring means and thereby cutting off the flow of water through said valve outlet port, a first bleeder port intercommunicating the interior of said housing and said control conduit to permit refilling of said pressure pad at a metered rate, and a second bleeder port intercommunicating said supply conduit and the interior of said housing behind said piston to permit slow "make-up" of any water losses in the mechanism.

4. A water sprinkler control system comprising in combination, a sprinkler, a water supply conduit under pressure, a valve device receiving water from said supply conduit and normally passing said water directly to the sprinkler, said valve device including a housing and a piston movable therein, said piston having a water passageway transversely therethrough in alignment with the valve inlet and outlet portions when in one position of said piston, a compression spring biasing said piston towards said position, and a valve control mechanism including a control conduit connected at one end in open communication with a control pressure inlet port leading to the interior of said housing behind said piston, said control conduit having branched apart terminal ends each connecting thereat with a pressure pad adapted to be disposed at a position remote from said sprinkler, said housing inlet port being controlled by a check valve device, whereby when pressure is applied to either of said control pads fluid is displaced therefrom and through said control conduit into said port thereby unseating said check valve, whereby water under increased pressure passes through said check valve interiorly of said housing behind said piston thereby displacing the latter against said spring means and thereby cutting off the flow of water through said valve outlet port, a bleeder port intercommunicating the interior of said housing and said control conduit to permit refilling of the depressed pressure pad at a metered rate, and metered or water channel means intercommunicating said supply conduit and the interior of said housing behind said piston to permit metered "make-up" of water losses in the system.

References Cited by the Examiner

UNITED STATES PATENTS

| 2,761,733 | 9/56 | Preus | 239—578 |
| 2,793,075 | 5/57 | Gulick | 239—570 |
| 2,839,264 | 6/58 | Trubert | 251—57 |
| 2,997,851 | 8/61 | Trubert | 60—54.6 |

EVERETT W. KIRBY, *Primary Examiner.*